(12) United States Patent
Good et al.

(10) Patent No.: US 9,932,107 B2
(45) Date of Patent: Apr. 3, 2018

(54) ENHANCING AERODYNAMIC PERFORMANCE OF AN AIRCRAFT WING ASSEMBLY

(71) Applicant: The Boeing Company, Chicago, IL (US)

(72) Inventors: Mark S. Good, Seattle, WA (US); Steven Paul Walker, Arlington, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 15/007,172

(22) Filed: Jan. 26, 2016

(65) Prior Publication Data
US 2016/0137285 A1   May 19, 2016

Related U.S. Application Data

(62) Division of application No. 13/664,371, filed on Oct. 30, 2012.

(51) Int. Cl.
*B64C 3/56* (2006.01)

(52) U.S. Cl.
CPC ............ *B64C 3/56* (2013.01); *Y02T 50/145* (2013.01)

(58) Field of Classification Search
CPC   B64C 3/56; B64C 1/26; B64C 23/065; B64C 3/26; Y02T 50/145
See application file for complete search history.

(56) References Cited

U.S. PATENT DOCUMENTS

| 2,719,682 | A | * | 10/1955 | Handel ............... B64C 3/56 160/213 |
|---|---|---|---|---|
| 2,881,994 | A | | 4/1959 | Michael |
| 3,081,053 | A | | 3/1963 | Jarrell |
| 4,979,700 | A | | 12/1990 | Tiedeman et al. |
| 5,201,479 | A | | 4/1993 | Renzelmann |
| 5,310,138 | A | | 5/1994 | Fitzgibbon |
| 5,381,986 | A | | 1/1995 | Smith et al. |
| 5,558,299 | A | | 9/1996 | Veile |
| 6,082,665 | A | | 7/2000 | Spitzer |
| 6,270,039 | B1 | | 8/2001 | Linjama |
| 6,834,835 | B1 | | 12/2004 | Knowles |
| 7,322,545 | B2 | | 1/2008 | Sheahan, Jr. |
| 7,975,965 | B2 | | 7/2011 | Ackermann |
| 8,733,692 | B2 | | 5/2014 | Kordel |
| 2009/0283639 | A1 | | 11/2009 | Ackermann et al. |

(Continued)

FOREIGN PATENT DOCUMENTS

EP   2650212 A1   10/2013

OTHER PUBLICATIONS

Folding wing, http://en.wikipedia.org/wiki/Folding_wing.
Search Report for related European Application No. EP13190920.2; report dated Nov. 8, 2017.

*Primary Examiner* — Valentina Xavier
(74) *Attorney, Agent, or Firm* — Miller, Matthias & Hull LLP

(57) ABSTRACT

Disclosed is a method of enhancing aerodynamic performance of an aircraft wing assembly including a fixed section and a foldable section. The foldable section is hinged to the fixed section at a hinge axis. The method includes turning a torque box extending from the foldable section to rotate the foldable section about the hinge axis from a stowed position to a deployed position.

18 Claims, 5 Drawing Sheets

(56) References Cited

U.S. PATENT DOCUMENTS

| | | |
|---|---|---|
| 2009/0302159 A1 | 12/2009 | Pajard |
| 2011/0038576 A1 | 2/2011 | Thornton |
| 2011/0180657 A1 | 7/2011 | Gionta et al. |
| 2014/0319268 A1 | 10/2014 | Lassen |
| 2015/0014478 A1 | 1/2015 | Lassen |

* cited by examiner

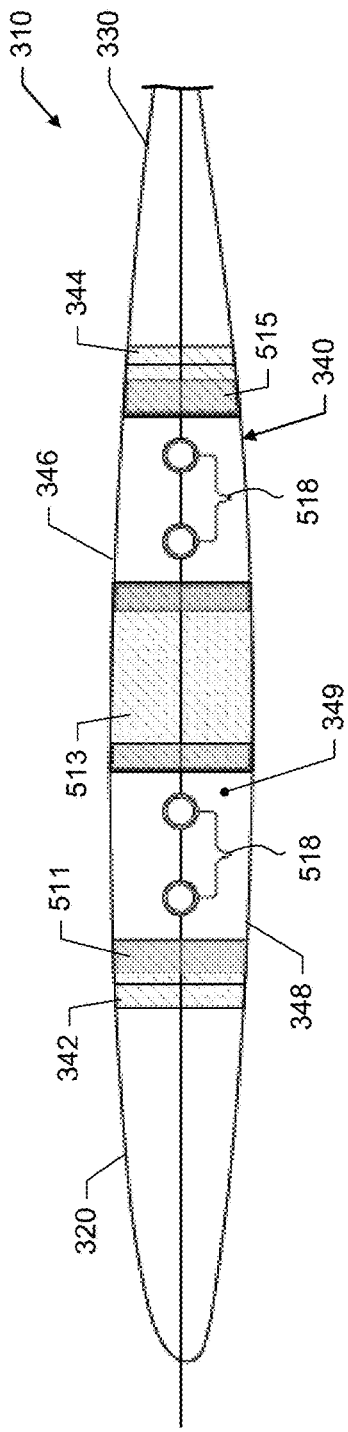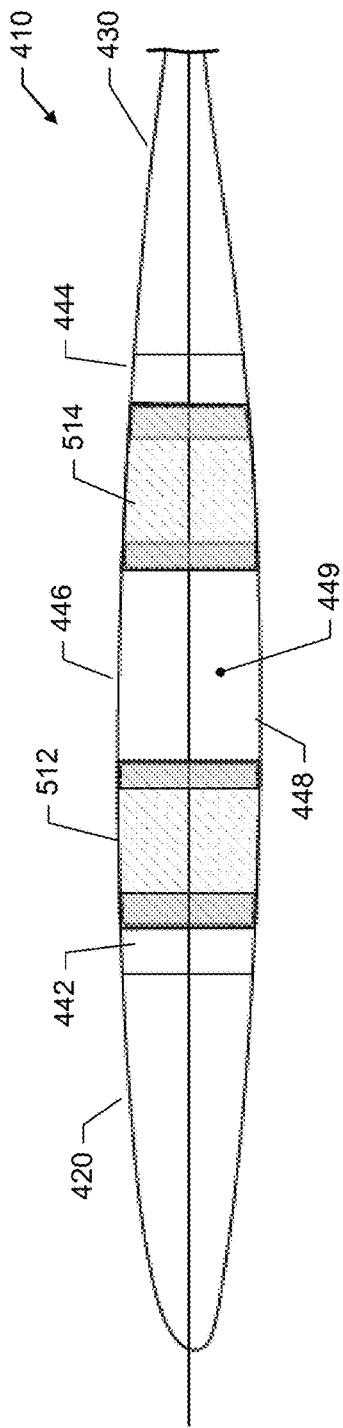

ENHANCING AERODYNAMIC PERFORMANCE OF AN AIRCRAFT WING ASSEMBLY

This is a divisional of copending U.S. Ser. No. 13/664,371 filed 30 Oct. 2012.

BACKGROUND

Long span wings are desirable for commercial aircraft as they are more aerodynamically efficient than shorter wings. The greater aerodynamic efficiency results in lower fuel consumption and, therefore, lower operating costs.

However, existing airport designs place limits on aircraft wingspan. Airport designs are based on International Civil Aviation Organization (ICAO) Codes A through F, which establish dimensional limits on wingspan, landing gear width, length, etc. For instance, an ICAO Code E airport limits wingspan to less than 65 meters so that aircraft can fit within runways, taxiways and gate areas.

A folding wing design may be used to reduce the span of these wings to fit within the limitations of an existing airport's infrastructure. Folding wings may be folded to fit within parking areas and taxiways, and they may be deployed prior to takeoff to increase wing span.

Folding wing designs are commonly used in naval aircraft. Folding wings enable naval aircraft to occupy less space in confined aircraft carrier hangars. Wing fold joints in naval aircraft use highly loaded hinges and locking pins acting over very small wing bending reaction moment arms. However, naval aircraft are much smaller than large commercial aircraft, and present folding wing designs for naval aircraft are optimized to different mission parameters than large commercial aircraft.

In commercial aircraft, a folding wing design may be scaled up. High reaction loads may be overcome by increasing the size of the hinges and locking pins. However, these size increases would increase aircraft weight, and increases in aircraft weight are undesirable because operating costs such as fuel costs are increased. Consequently, the increase in weight negates the advantages offered by the long span wings.

SUMMARY

A method of enhancing aerodynamic performance of an aircraft wing assembly including a fixed section and a foldable section. The foldable section is hinged to the fixed section at a hinge axis. The method comprises turning a torque box extending from the foldable section to rotate the foldable section about the hinge axis from a stowed position to a deployed position.

A method of enhancing aerodynamic performance of an aircraft. The aircraft has a wing assembly including a wing tip having a first torque box, and a fixed section having a second torque box extending outward in a spanwise direction. The first and second torque boxes hinged together about a hinge axis. Enhancing the aerodynamic performance includes turning the first torque box about the hinge axis to fold the wing tip from a stowed position to a deployed position; and latching the first torque box after the wing tip has been folded to the deployed position.

These features and functions may be achieved independently in various embodiments or may be combined in other embodiments. Further details of the embodiments can be seen with reference to the following description and drawings.

BRIEF DESCRIPTION OF THE DRAWINGS

FIG. 1 is an illustration of an aircraft including wing assemblies.

FIGS. 3 and 4 are illustrations of fixed and foldable sections of a wing assembly.

DETAILED DESCRIPTION

Figure 2A:
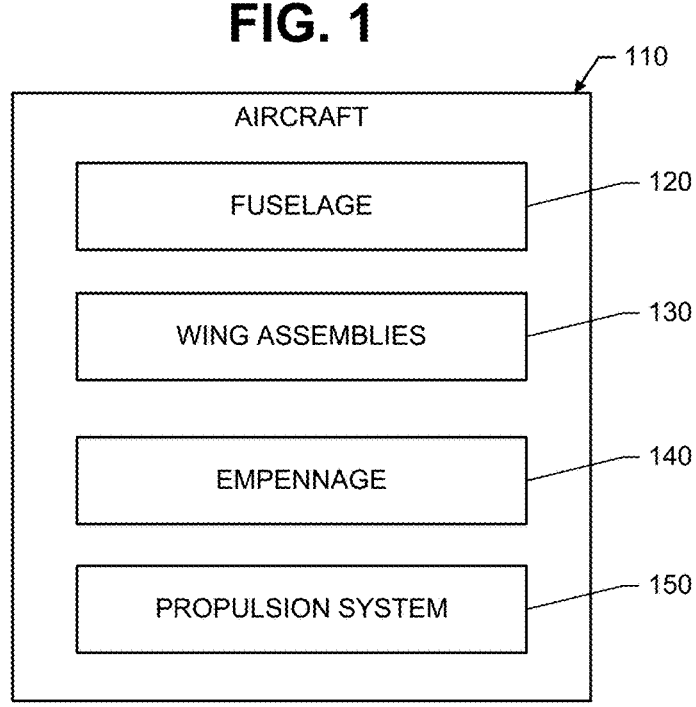
FIGS. 2A and 2B are illustrations of a wing tip in a stowed position and a deployed position, respectively.

Reference is made to FIG. 1, which illustrates an aircraft 110 including a fuselage 120, wing assemblies 130, and empennage 140. One or more propulsion units 150 are coupled to the fuselage 120, wing assemblies 130 or other portions of the aircraft 110. In some embodiments, the wing assemblies 130 are swept (see, e.g., FIG. 7). Each wing assembly 130 includes a fixed inboard section and a foldable outboard section. The foldable section is hinged to the fixed section for movement between a stowed position and a deployed position. The foldable section may be stowed to fit the aircraft 110 within runways, taxiways and gate areas. Stowing the foldable section may enable the aircraft to comply with airport codes, such as ICAO codes. The foldable sections may be deployed prior to takeoff to lengthen the wingspan. The lengthened wingspan enables higher aerodynamic efficiency without incurring penalties from increased weight or drag.

The fixed inboard section, which may be a main wing or an inboard section thereof, includes moveable flight control surfaces (e.g., ailerons, slats, flaps). The foldable outboard section may include moveable flight control surfaces. In some embodiments, the foldable outboard section may be a wing tip. In other embodiments, the foldable section may be an outboard section of the main wing.

Figure 2B:
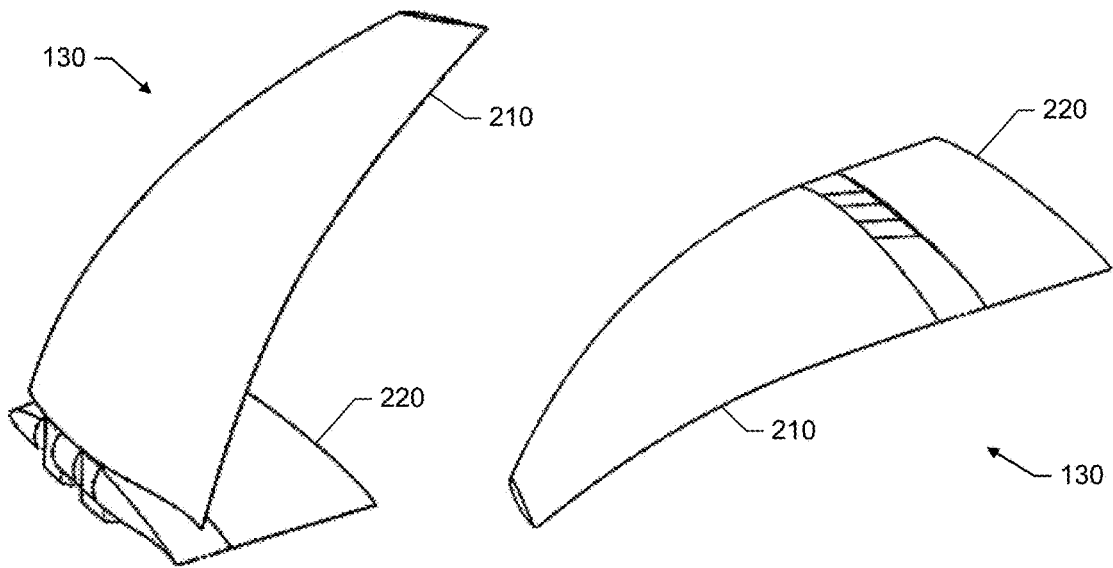

FIGS. 2A and 2B are illustrations of a wing assembly 130 including a foldable wing tip 210 hinged to a fixed main wing 220. FIG. 2A shows the wing tip 210 in a stowed position, and FIG. 2B shows the wing tip 210 in a deployed position. In some embodiments, the wing tip 210 may be stowed in a roughly vertical position to minimize ground area. In other embodiments, the wing tip 210 may be folded back onto the main wing 220. FIGS. 2A and 2B show a wing tip that is raked. However, a wing tip herein is not so limited.

Reference is now made to FIG. 3, which illustrates an example of a fixed section 310 of the wing assembly 130. The fixed section 310 includes a leading edge 320, trailing edge 330 and wing box 340. The wing box 340 includes front and rear spars 342 and 344, upper and lower skin panels 346 and 348, and ribs. The spars 342 and 344 extend in a spanwise direction, and the ribs extend in a chordwise direction. In FIG. 3, only the closeout rib 349 is shown. The wing box 340 may also include stringers (not shown), which extend in a spanwise direction.

Reference is now made to FIG. 4, which illustrates an example of the foldable section 410 of the wing assembly 130. The foldable section 410 includes a leading edge 420, trailing edge 430 and wing box 440. The wing box 440 includes front and rear spars 442 and 444, upper and lower skin panels 446 and 448, and ribs. The spars 442 and 444 extend in a spanwise direction, and the ribs extend in a chordwise direction. In FIG. 4, only the closeout rib 449 is shown. The wing box 440 may also include stringers (not shown), which extend in a spanwise direction, and mid spars (not shown) in addition to the front and rear spars 442 and 444.

Figure 5:
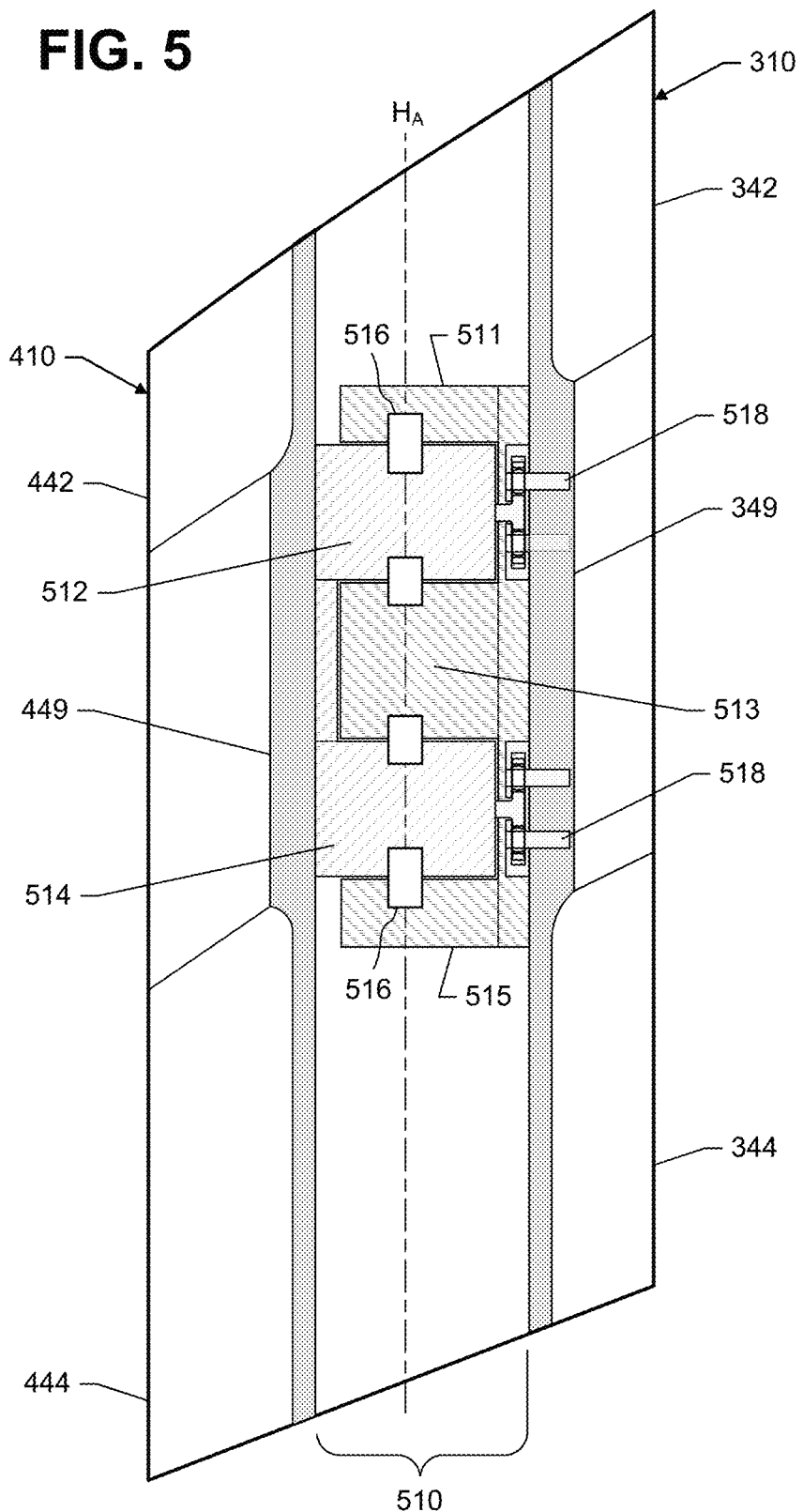
FIG. 5 is an illustration of a hinge assembly for hinging the foldable section to the fixed section.

Additional reference is made to FIG. 5, which illustrates a hinge assembly 510 for hinging the foldable section 410 to the fixed section 310. The hinge assembly 510 includes a plurality of interleaved torque boxes that are hinged together. The example illustrated in FIG. 5 shows a total of five torque boxes 511, 512, 513, 514, and 515. First, second and third torque boxes 511, 513 and 515 extend from the closeout rib 349 of the fixed section 310. Fourth and fifth torque boxes 512 and 514 extend from the closeout rib 449 of the foldable section 410. The fourth torque box 512 is hinged between the first and second torque boxes 511 and 513 by hinge pins 516. The fifth torque box 514 is hinged between the second and third torque boxes 513 and 515 by hinge pins 516.

Figure 6A:
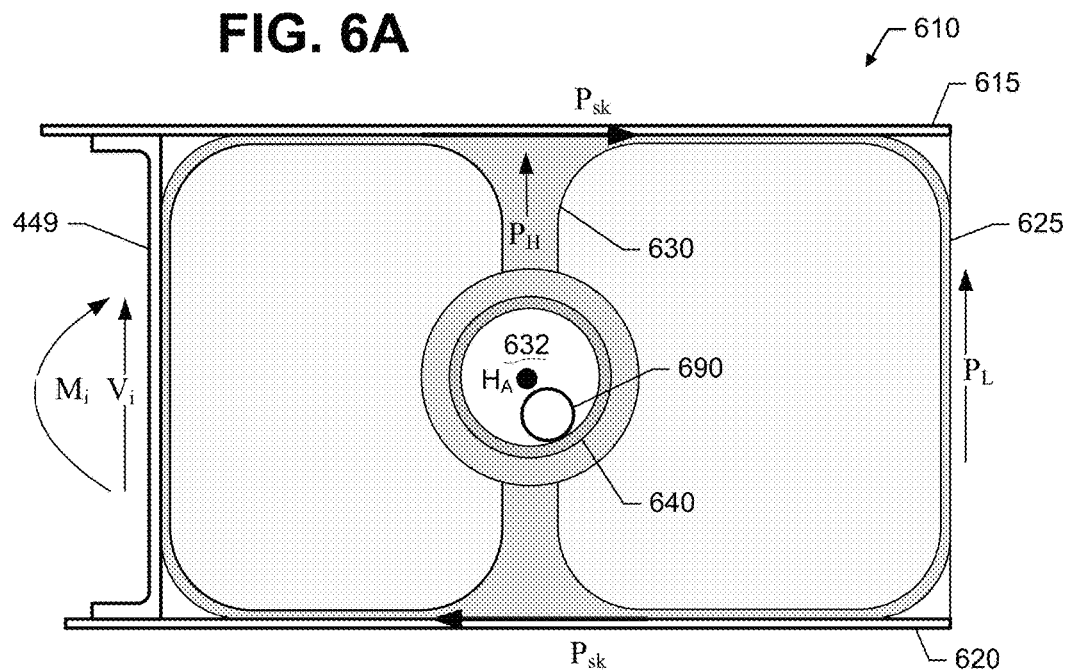
FIGS. 6A and 6B are illustrations of torque boxes for the hinge assembly.
Figure 6B:
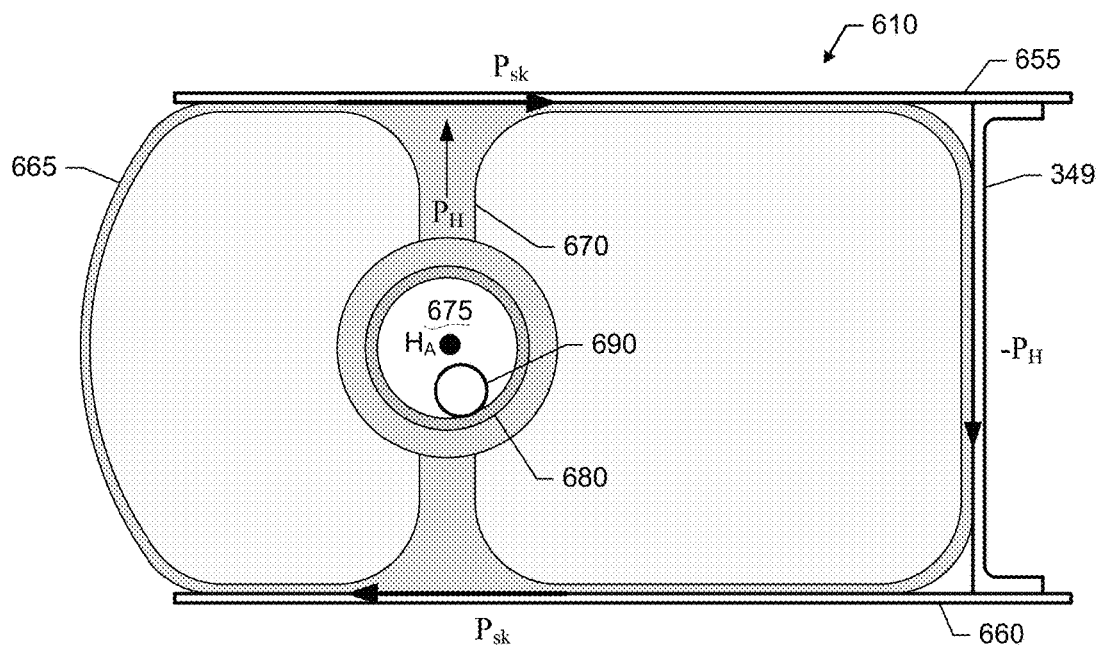

A hinge axis $H_A$ extends through the pins 516 in a chordwise direction through a center of the wing assembly 130 (the central location of the hinge axis $H_A$ is best shown in FIGS. 6A and 6B). The foldable section 410 is folded about the hinge axis $H_A$. The foldable section 410 may be folded upward or downward into a stowed position. The foldable section 410 may be deployed to a position that is in-plane with the fixed section 310, thereby extending the span of the wing assembly 130. Although a chordwise hinge axis $H_A$ is shown in FIG. 5, a skewed hinge axis may be used in some embodiments.

The foldable section 410 may be locked to the fixed section 310 by latch pins 518. In the embodiment shown in FIG. 5, for instance, the latch pins 518 may extend through the closeout rib 349 of the fixed section 310 and engage locking pin receptacles, which are attached to the torque boxes 512 and 514 extending from the foldable section 410.

Other embodiments of the hinge assembly 510 may include other numbers of torque boxes. For instance, another embodiment of a hinge assembly herein may utilize ribs instead of the outer torque boxes 511 and 513. Yet another embodiment of a hinge assembly herein may only include a single torque box extending from the foldable section and hinged between two torque boxes extending from the fixed section. However, at least two torque boxes extending from each closeout rib are advantageous, as they provide redundant load paths. The three torque boxes 511, 513, and 515 advantageously provide a shear interface on either side of the torque boxes 512 and 514 extending from the foldable section 410. Spatial constraints may limit the use of additional torque boxes.

Reference is now made to FIG. 6A, which provides an example of a "foldable-side" torque box 610 for the hinge assembly 510. The foldable-side torque box 610 includes a stiffening substructure covered by top and bottom skin panels 615 and 620. The stiffening substructure may include two ribs 625 that extend outboard of the foldable section closeout rib 449 (only one rib 625 is shown in FIG. 6A). The ribs 625 are spaced apart along the hinge axis $H_A$. The skin panels 615 and 620 connect to the closeout rib 449 and to the two ribs 625 of the foldable-side torque box 610.

The ribs 625 alone may provide stiffness against bending. If the wing assembly 130 is swept, however, it will also have torsion associated with wing bending. Torsional stiffness is desirable to maintain the angle of attack and prevent flutter. The torque box 610 provides the desired stabilization in all directions, including the spanwise direction The torque box 610 further includes a shear web 630 between the skin panels 615 and 620. The shear web 630 provides a continuous shear path between the top and bottom skin panels 615 and 620. As the wing assembly 130 is bent and twisted during flight, the shear web 630 transfers a load $M_i$ between the skin panels 615 and 620. This allows the wing moment $M_i$; to be reacted by equal and opposite vertical loads $P_L$ and $P_H$ at the hinge and latch. Horizontal forces Psk (that is, the loads through the skin panels 615 and 620) are balanced by the vertical forces $P_L$ and $P_H$ The shear web 630 includes an opening 632 for insertion of a hinge pin 640. The opening 632 may be located mid-way between the top and bottom skin panels 615 and 620, whereby the hinge axis $H_A$ is centered inside the wing assembly. The central hinge axis $H_A$ also enables the hinge assembly 510 to be integrated entirely within the aerodynamic shape of the wing assembly 130. Because the hinge assembly 510 is not external, either drag is reduced or a fairing is not needed to reduce drag.

A cover (not shown) may close off the open end of the torque box 610. The cover may be removable to give access to the inside of the torque box 610. For instance, the torque box 610 may allow extraneous structure associated with the folding and latching mechanisms to be located in sealed cavities, for maximum protection from the environment.

FIG. 6B provides an example of a "fixed-side" torque box 650 for the hinge assembly 510. The fixed-side torque box 650 also includes a stiffening substructure covered by top and bottom skin panels 655 and 660. The stiffening substructure may include two ribs 665 that extend inboard of the fixed section closeout rib 349. The foldable-side torque box 610 may also include a shear web 670 with a central opening 675 for a hinge pin 680.

FIGS. 6A and 6B show hinge pins 640 and 680 that are hollow. The hollow hinge pins 640 and 680 allow electrical wires 690 to be routed though the center of the wing assembly 130. The electrical wires 690 may provide power to components such as wing tip position lights and strobes, sensors, etc. The hollow pins 640 and 680 may also allow for any hydraulic lines to pass through if the foldable section 410 has any movable surfaces that are actuated hydraulically.

A torque box herein is not limited to the construction illustrated in FIGS. 6A and 6B. More generally, a hinge assembly torque box herein is a closed structure that can carry both bending and torsional loads. In other embodiments, for example, the torque box may be a simple extruded tubular section.

Returning briefly to FIG. 5, the torque boxes 511, 512, 513, 514, and 515 may be built to the same aerodynamic contour as the rest of the wing assembly 130. The torque boxes 511, 512, 513, 514, and 515 and leading and trailing edges may all conform to the wing loft. The skin panels 615, 620, 655, and 660 may be cut to minimize the gap between the skin panels 346, 348, 446 and 448 on the fixed and foldable sections 310 and 410. Any remaining gaps may be filled with rigid or flexible seals.

Figure 7:
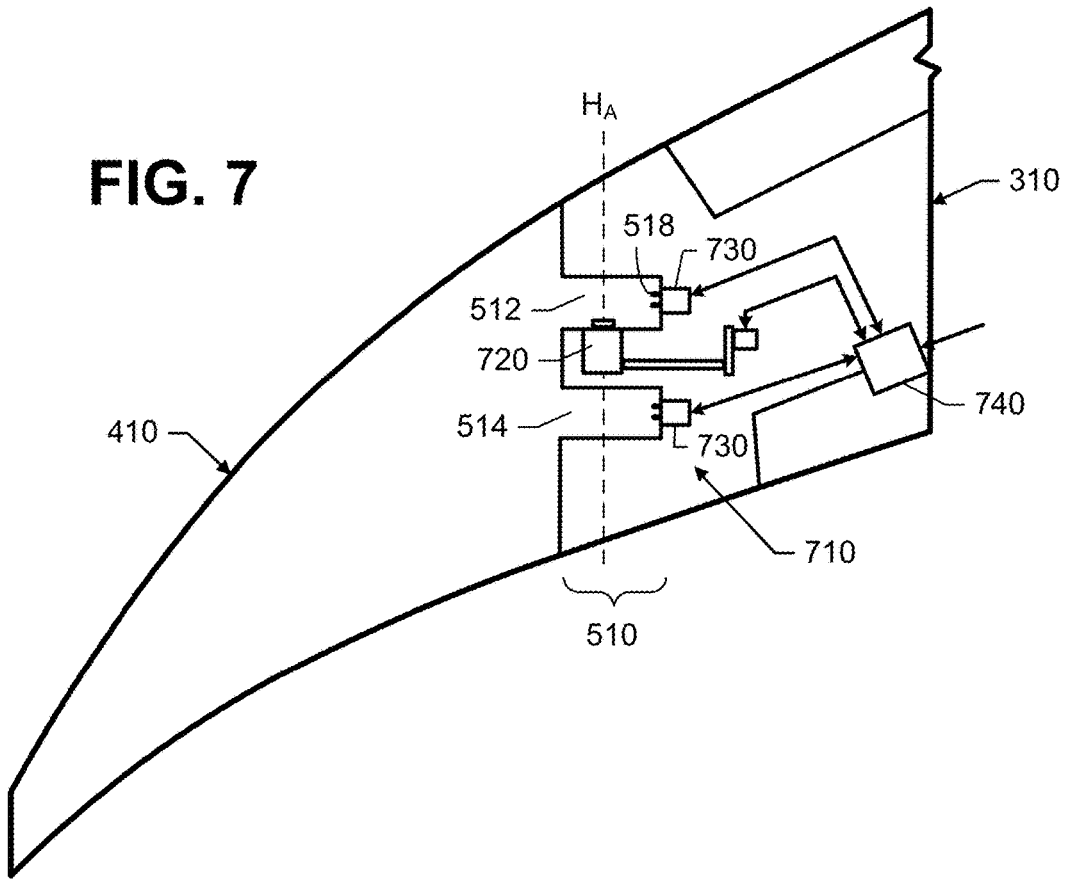
FIG. 7 is an illustration of an actuation and locking system for the hinge assembly.

Reference is now made to FIG. 7, which illustrates an actuation and locking system 710 for the hinge assembly 510 of FIG. 5. The system 710 includes a rotary actuator 720 for turning a foldable-side torque box 512. The hinge pins reduce the motion to rotation only. A drive shaft and the rotary actuator 720 are aligned with the hinge axis so that they don't impart forces to the degrees of freedom that are constrained. The rotary actuator 720 turns the torque box 512 about the hinge axis $H_A$ in a direction that rotates the foldable section 410 between the stowed position and the deployed position. The rotary actuator 720 may include, without limitation, a conventional planetary gearbox, or a rotary vane hydraulic actuator, or a hydraulic actuator that has a linear piston pushing against a helical screw.

The actuator system 710 also includes actuators for moving the latch pins 518 into and out of engagement with the torque boxes 512 and 514 that extend from the foldable section 410.

The actuator system 710 further includes a controller 740 for commanding the operation of the actuators 720 and 730. The controller 740 may include a microprocessor. The controller 740 may communicate with a flight computer (not shown) to determine when to deploy or stow the foldable section. 410. The controller 740 may also include hydraulic valves that sequence the actuators 720 and 730.

Figure 8:
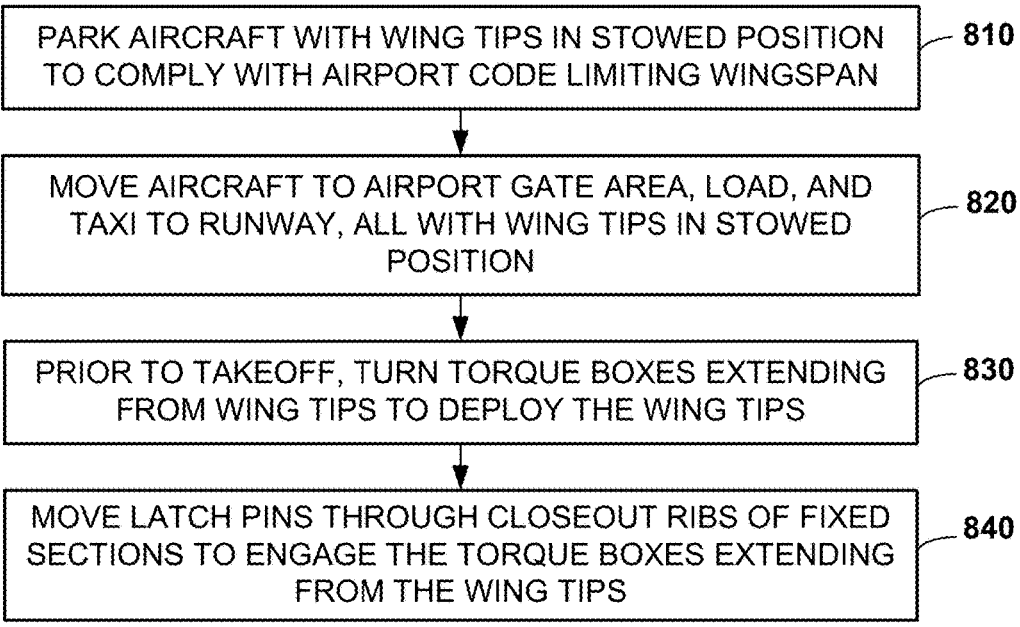
FIG. 8 is an illustration of a method of enhancing performance of a commercial aircraft including wing assemblies with folding wing tips.

Reference is now made to FIG. 8, which illustrates a method of enhancing performance of a commercial aircraft including wings with folding wing tips. The aircraft is located at an airport that place limits on aircraft's wingspan length. For instance, the airport is an ICAO Code E airport, which limits wingspan to less than sixty five meters.

At block 810, the aircraft is parked with outboard portions of its wing tips in a stowed position. At block 820, the aircraft is moved to a gate, loaded, and taxied to a runway. The wing tips remain in the stowed position so the aircraft can fit within taxiways en route to the runway.

At block 830, prior to takeoff, the outboard portions of the wing tips are deployed by turning a foldable-side torque box extending from the folding wing tip. The torque box is turned in a direction that rotates the folding wing tip from the stowed position to a deployed position.

At block 840, latch pins are moved through closeout ribs of fixed sections to engage torque boxes extending from the folding wing tips. In this manner, the wing tips are locked to the fixed sections.

By deploying the folding wing tip, wingspan is extended and, as a result, aerodynamic efficiency is increased. The greater aerodynamic efficiency results in lower fuel consumption during flight and, therefore, lowers operating costs and increased lift to optimize take-off.

Although a hinge assembly herein has been described in connection with a wing assembly of a commercial aircraft, it is not so limited. Other structures in the aircraft 110 of FIG. 1 may use a hinge assembly herein.

A hinge assembly herein is not even limited to commercial aircraft. For instance, a hinge assembly herein may be applied to helicopter blades, wind generator turbine blades, truck tailgates, folding ramps, robotic arms, etc.

The invention claimed is:

1. A method of enhancing aerodynamic performance of an aircraft wing assembly including a fixed section and a foldable section, the foldable section hinged to the fixed section at a hinge axis, the method comprising:
    turning a first hollow torque box extending from the foldable section and enclosing an interior void relative to a second hollow torque box extending from the fixed section and enclosing an interior void, the second hollow torque box being hinged to the first hollow torque box at the hinge axis, wherein the hinge axis extends through lateral sides of the first and second torque boxes, thereby to rotate the foldable section about the hinge axis from a stowed position to a deployed position.

2. The method of claim 1, further comprising latching the first hollow torque box after the foldable section has been rotated to the deployed position.

3. The method of claim 2, wherein the first hollow torque box is latched to at least one of the fixed section and the second hollow torque box.

4. The method of claim 2, when latching the first hollow torque box includes using latch pins to engage the first hollow torque box.

5. The method of claim 2, when latching the first hollow torque box includes extending latch pins through a closeout rib of the fixed section to engage the first hollow torque box.

6. The method of claim 1, wherein the aircraft wing assembly is part of an aircraft, and wherein the foldable section is rotated to the deployed position while the aircraft is on a runway prior to takeoff.

7. The method of claim 6, wherein the first hollow torque box is turned about the hinge axis to rotate the foldable section back to the stowed position after the aircraft has landed.

8. The method of claim 6, wherein the foldable section is in the stowed position while the aircraft is moved from a gate area to the runway.

9. The method of claim 1, wherein rotary actuators are used to turn the first hollow torque box about the hinge axis.

10. The method of claim 1, wherein the foldable section is a raked wing tip.

11. A method of enhancing aerodynamic performance of an aircraft, wherein the aircraft has a wing assembly including a wing tip having a first hollow torque box enclosing an interior void, and a fixed section having a second hollow torque box enclosing an interior void and extending outward in a spanwise direction, the first and second hollow torque boxes hinged together about a hinge axis, and wherein enhancing the aerodynamic performance includes:
    turning the first hollow torque box about the hinge axis to fold the wing tip from a stowed position to a deployed position; and
    latching the first hollow torque box after the wing tip has been folded to the deployed position.

12. The method of claim 11, wherein the first hollow torque box is latched to the fixed section.

13. The method of claim 11, when latching the first hollow torque box includes using latch pins to engage the first hollow torque box.

14. The method of claim 11, when latching the first hollow torque box includes extending latch pins through a closeout rib of the wing tip to engage the first hollow torque box.

15. The method of claim 11, wherein rotary actuators are used to turn the first hollow torque box about the hinge axis.

16. The method of claim 11, wherein the wing tip is folded to the deployed position while the aircraft is on a runway prior to takeoff.

17. The method of claim 16, wherein the first hollow torque box is turned about the hinge axis to fold the wing tip back to the stowed position after the aircraft has landed.

18. The method of claim 16, wherein the wing tip is in the stowed position while the aircraft is moved from a gate area to the runway.

\* \* \* \* \*